United States Patent
Will et al.

(10) Patent No.: US 12,103,689 B2
(45) Date of Patent: Oct. 1, 2024

(54) AIRCRAFT-GALLEY MODULE WITH OPEN/CLOSED-LOOP COOLING/HEATING

(71) Applicant: SAFRAN CABIN GERMANY GMBH, Herborn (DE)

(72) Inventors: Christian Will, Driedorf (DE); Alexander Kusch, Herborn (DE); Samuel Klassen, Herborn (DE)

(73) Assignee: SAFRAN CABIN GERMANY GMBH, Herborn (DE)

( * ) Notice: Subject to any disclaimer, the term of this patent is extended or adjusted under 35 U.S.C. 154(b) by 225 days.

(21) Appl. No.: 17/762,426

(22) PCT Filed: Sep. 23, 2019

(86) PCT No.: PCT/EP2019/075538
§ 371 (c)(1),
(2) Date: Mar. 22, 2022

(87) PCT Pub. No.: WO2021/058080
PCT Pub. Date: Apr. 1, 2021

(65) Prior Publication Data
US 2022/0332427 A1 Oct. 20, 2022

(51) Int. Cl.
*B64D 13/08* (2006.01)
*B64D 11/04* (2006.01)
*F25B 21/04* (2006.01)
*B64D 13/06* (2006.01)

(52) U.S. Cl.
CPC .............. *B64D 13/08* (2013.01); *B64D 11/04* (2013.01); *F25B 21/04* (2013.01); *B64D 2013/0629* (2013.01); *F25B 2321/023* (2013.01); *F25B 2321/0251* (2013.01)

(58) Field of Classification Search
CPC ........ B64D 13/06; B64D 13/08; B64D 11/04; B64D 2013/0629; F25B 21/04; F25B 21/02; F25B 21/00; F25B 2321/023; F25B 2321/02; F25B 2321/0251
See application file for complete search history.

(56) References Cited

U.S. PATENT DOCUMENTS

| | | | |
|---|---|---|---|
| 6,845,627 B1* | 1/2005 | Buck | F25D 17/02 |
| | | | 62/130 |
| 8,516,832 B2 | 8/2013 | Bhavsar | |
| 9,238,398 B2* | 1/2016 | Lu | F25D 15/00 |
| 9,676,483 B2* | 6/2017 | Godecker | F25D 17/02 |
| 10,252,804 B2* | 4/2019 | Schalla | F25D 16/00 |

(Continued)

*Primary Examiner* — Miguel A Diaz
(74) *Attorney, Agent, or Firm* — Andrew Wilford

(57) ABSTRACT

The invention relates to An aircraft on-board kitchen module (1) comprising at least one heater and/or cooler with at least one first compartment (2) for drinks and/or food and whose temperature can be conditioned by at least one thermoelectric element (5) having a first and a second heat exchanger (8, 9), one of the heat exchangers (8, 9) forming a cold side and the other heat exchanger (8, 9) forming a hot side of the thermoelectric element (5) such that heat generated by the thermoelectric element (5) is dissipated by a primary coolant from a central cooling system (11) of the aircraft, the primary coolant being supplied via a coolant duct (10) that is selectively supplied with ambient air from the cabin and/or conditioned cold air from the central cooling system (11) of the aircraft.

12 Claims, 2 Drawing Sheets

(56) References Cited

U.S. PATENT DOCUMENTS

| | | |
|---|---|---|
| 10,315,487 B2 | 6/2019 | Tsai |
| 11,136,125 B2 * | 10/2021 | Tsai ........................ F25D 15/00 |
| 11,982,473 B2 * | 5/2024 | Ghoshal ................. H10N 10/13 |
| 2008/0173023 A1 * | 7/2008 | Wu ......................... F25B 21/02 |
| | | 62/3.2 |
| 2010/0071384 A1 | 3/2010 | Lu |
| 2010/0224726 A1 * | 9/2010 | Lu ........................... F25D 17/06 |
| | | 62/507 |
| 2018/0002030 A1 * | 1/2018 | Klassen ................. B64C 1/1407 |
| 2018/0016018 A1 * | 1/2018 | Burd ..................... F25D 17/045 |
| 2018/0086469 A1 * | 3/2018 | Truemper ............. B64D 13/08 |
| 2018/0201374 A1 | 7/2018 | Trumper |
| 2021/0140699 A1 * | 5/2021 | Moran ................... B64D 11/04 |
| 2021/0183740 A1 * | 6/2021 | Burd ..................... B64D 11/04 |
| 2023/0400231 A1 * | 12/2023 | Pearson ................. F25B 21/04 |

\* cited by examiner

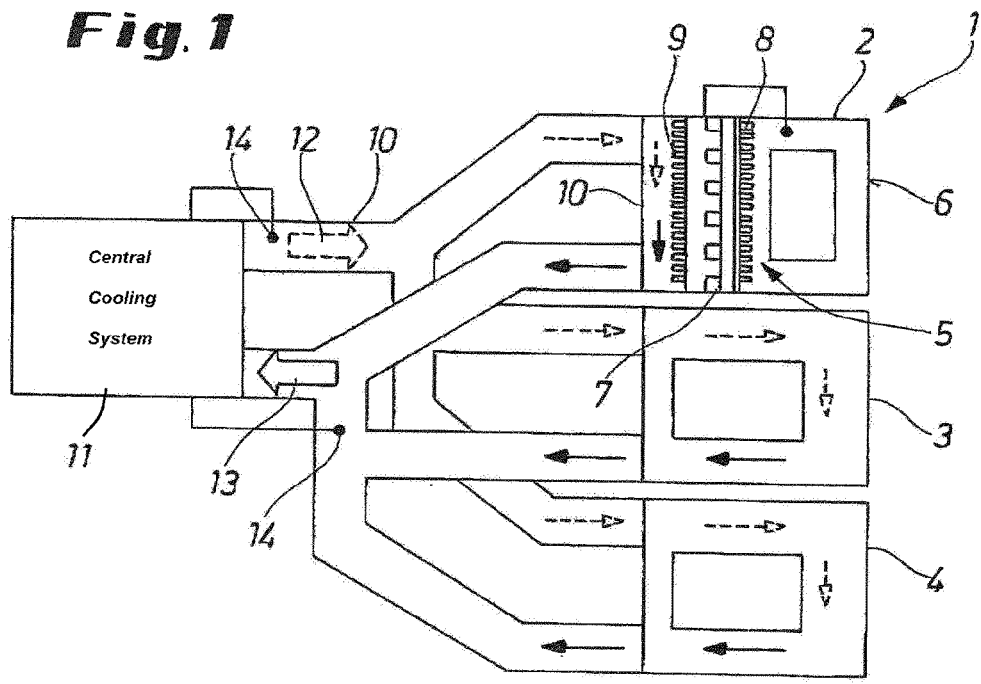
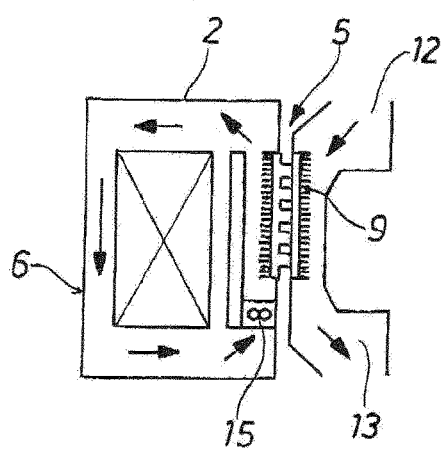
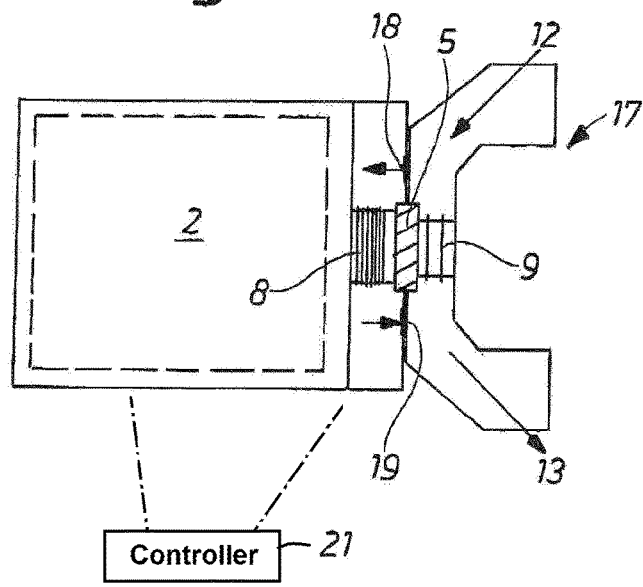

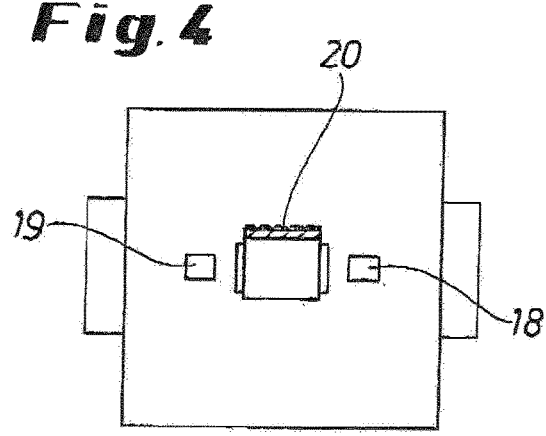
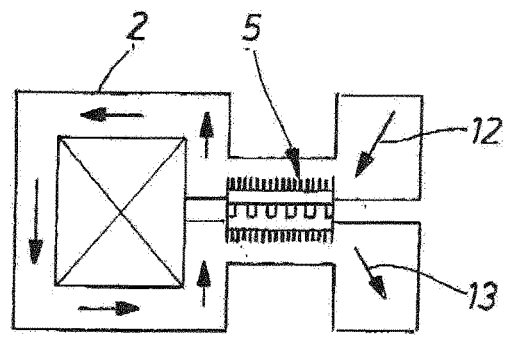
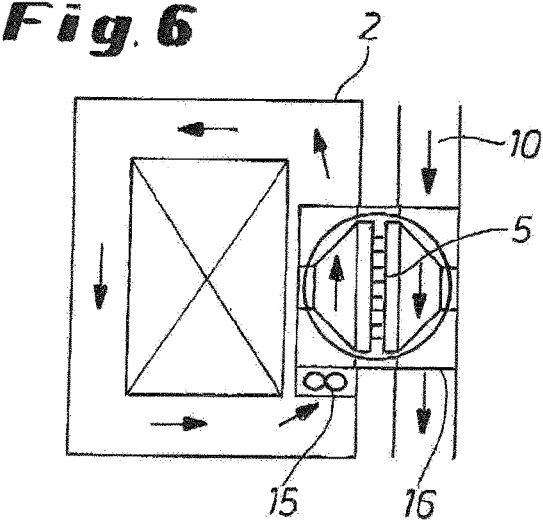
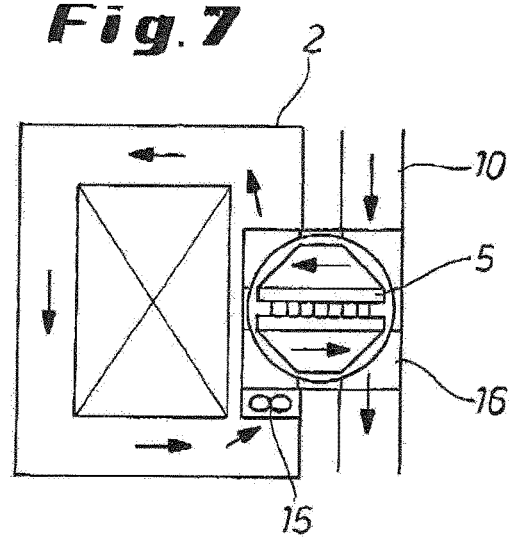

AIRCRAFT-GALLEY MODULE WITH OPEN/CLOSED-LOOP COOLING/HEATING

CROSS REFERENCE TO RELATED APPLICATIONS

This application is the US-national stage of PCT application PCT/EP2019/075538 filed 23 Sep. 2019 and claiming the priority of PCT patent application PCT/EP2019/075538 itself filed 23 Sep. 2019.

FIELD OF THE INVENTION

The invention relates to an aircraft galley module comprising at least one heater and/or cooler with at least one first compartment for beverages and/or food and whose temperature is conditioned by at least one thermoelectric element having a first and a second heat exchanger, one of the first and second heat exchangers forming a cold side and the other heat exchanger forming a hot side of the thermoelectric element such that heat generated by the thermoelectric element is extracted by a primary coolant from a central cooling system of the aircraft.

The invention further relates to a method of controlling with or without feedback the temperature in a preferably closed compartment of a galley module according to the invention.

BACKGROUND OF THE INVENTION

WO 2017/173130 [U.S. Pat. No. 10,315,487], for example, describes a solid-state cooler for a galley of an aircraft kitchen that has at least one cooling compartment cooled by a device that is designed as a so-called solid-state air-air cooler. Such thermoelectric devices are generally also referred to as Peltier elements. Such a thermoelectric element has semiconductors that generate a voltage when a temperature difference is applied on both sides or a temperature difference when a voltage is applied to both sides.

The semiconductors are usually sandwiched between thermal heat exchangers with fins or heat exchangers with a liquid heat-transfer medium. Usually the hot side of the Peltier element is cooled by a fan placed on the on the cooling device that causes the cooling side or cold side of the thermoelectric element to be cooled even further.

The galley described in WO 2017/173130 has a cooler with a stack of cooling compartments holding Peltier elements. A first thermoelectric device in the uppermost refrigeration compartment receives cool air and guides it in a cascade down through the underlying cooling compartments.

U.S. Pat. No. 8,516,832 describes a control system for a thermoelectric cooling system that is for an aircraft galley and that controls a plurality of thermoelectric elements electrically connected in parallel and in series. The cooling system has a closed cooling compartment through which coolant is moved by a fan on the cold side of the thermoelectric element. On the hot side of the thermoelectric element is a heat exchanger that is preferably cooled with a liquid cooling medium from a central cooling system of the aircraft.

Today's airplane galleys are equipped with so-called galley refrigeration units whose refrigerated compartments, both open and closed, can be cooled to a fixed low temperature. Control of the temperature of the refrigerated compartments by the cabin crew is not possible.

OBJECTS OF THE INVENTION

The object of the invention is to provide a galley module of the above-described type in which the temperature prevailing in the compartments for food and/or beverages can be adjusted by the on-board personnel. Another object of the invention is to provide a method of controlling the temperature in such a compartment of a galley module according to the invention.

SUMMARY OF THE INVENTION

The objects underlying the invention are attained by a galley module for an aircraft comprising at least one heater and/or cooler with at least one first compartment for drinks and/or food and whose temperature can be conditioned by at least one thermoelectric element, the thermoelectric element comprising first and second heat exchangers, one heat exchanger forming a cold side and the other heat exchanger forming a hot side of the thermoelectric element, the waste heat of the thermoelectric element being extracted by a primary coolant from the cooling system of the aircraft, the galley module in accordance with the invention being characterized in particular by the fact that the primary cooling medium is supplied via a coolant duct that is optionally supplied with ambient air and/or conditioned cold air from the central cooling system of the aircraft. In this way, the food and/or beverage compartment in question can be cooled or heated in different operating modes and for each different compartment a temperature can be provided for each operating mode.

The galley module according to the invention can have a plurality of heat compartments and/or refrigeration compartments that may be closed compartments, open compartments or drawers for use as open compartments or as drink drawers.

In the galley module according to the invention, for example, the first compartment may be heated or cooled by a thermoelectric element, whereas a second and/or further compartments can only be conditioned with cold air from the central cooling system of the aircraft.

The first compartment can, for example, be optionally heatable or coolable so that switching from heating to cooling or vice versa can be achieved for example by a corresponding switching of the polarity of the thermoelectric element. According to the invention, several thermoelectric elements (Peltier elements) can be connected in parallel and/or in series to elements (Peltier elements) each assigned to a respective single compartment, for the sake of simplicity below the term "thermoelectric element" is used.

In a preferred variant of the galley module according to the invention the first compartment is designed as a compartment whose air circulation can be switched between at least two operating modes, where in the first operating mode there is closed air circulation within the compartment and in a second operating mode open circulation. In the second operating mode, ambient air can be circulated via the cooling air from the cabin and/or conditioned cold air from the central cooling system of the cooling system of the aircraft through the compartment. This is for example useful when switching from heating to cooling or from cooling to heating. After a heating operation, the remaining warm air in the compartment can first be purged from the compartment, so that further cooling of the cabin air from the temperature level of the cabin air or from the temperature level of the conditioned cold air can take place. When switching from cooling mode to heating mode, the compartment can be heated further from the temperature level of the compartment air. This is particularly effective in terms of energy.

In an appropriate variant of the galley module according to the invention it is provided that the first compartment has a fan that is not mechanically coupled to the thermoelectric element. In this way, it is relatively easy to create circulation of air within the compartment, which is controlled by the cooling air circulated through the coolant duct.

The thermoelectric element can have at least one further fan or blower.

The above-described operating modes can be realized in an advantageous variant of the according to the invention in that the first heat exchanger is in a cool-air distributor of the cooling air passage, the cool-air distributor having at least one operable intake air flap and one operable exhaust air flap, and the intake air flap and the exhaust air flap in the open position allow for flow of the primary coolant through the compartment. In the first operating mode the intake air damper and the exhaust air damper are preferably closed, so that the air circulates around the compartment and the compartment and central cooling system of the aircraft are separated. In this operating mode, one side of the thermoelectric element or preferably the first heat exchanger is impinged with ambient air from the cabin and/or with conditioned cold air from the central cooling system of the aircraft.

In the second operating mode, the intake air damper and the exhaust air damper are preferably open. In this operating mode, the air circuits of the compartment and of the central cooling system of the aircraft are connected with each other, so that ambient air from the cabin and/or conditioned cold air from the central cooling system of the aircraft can be circulated through the compartment.

It is expedient that at least one fan is provided in the cooling duct and/or in the cool-air distributor that can maintain air circulation through the duct and/or the cool-air distributor independently of the compartment.

The galley module according to the invention may comprise at least a second compartment having at least a second thermoelectric element to which optionally is supplied ambient air and/or conditioned cold air from the central cooling system of the aircraft.

In another variant of the galley module according to the invention, the first heat exchanger is in an air-intake duct connected to the first compartment and the primary cooling medium is, if necessary, cooled by the cold side of the thermoelectric element, and the second heat exchanger is in an air-output duct extending from the first cooling compartment. In this variant of the galley module it is advantageous if the first compartment has a permanently open cold air circulation that is not separated from the coolant duct of the primary coolant. For example, if a cooling operation is to be realized inside the compartment, such a configuration allows it to reach temperatures significantly below normal cooling compartment temperatures. Typical temperatures for galley refrigeration compartments range from between 4 EC and 7 EC. With the above-described arrangement according to the invention, refrigerator compartment temperatures can be achieved that are well below the freezing point.

It is particularly advantageous if the thermoelectric element is between the air-intake duct and the air-output duct. In this way, one can easily control a gradual cooling of the air cooling of the air supplied to the first compartment.

According to the invention, a further advantageous variant of the galley module is proposed where the thermoelectric element is rotatably mounted in an air-guide housing that is between the coolant duct of the central cooling system and a coolant duct of the first compartment or a boundary wall of the first compartment.

Preferably, the thermoelectric element is rotatable during operation inside the air-guide housing by a drive at least from a first operating mode to a second operating mode, and in the first operating mode the primary coolant is separated from its own cold air circulation of the first cooling compartment and in the second operating mode the primary cooling medium is circulated through the first compartment. In this way it is possible to switch between at least two operating modes of the compartment concerned, in the first one of which the air circuits of the cooling compartment and the primary cooling system are separated, and in the second one of which the air circuits of the compartment and the of the compartment and the central cooling system communicate with each other.

In this configuration of the galley module according to the invention, further modes of operation can be achieved by switching the orientation of the hot and cold sides of the thermoelectric element by a 180 E rotation. In this way it is relatively easy to switch from heating to cooling and vice versa. Further operating modes are possible by switching from ambient air to conditioned cold air and by controlling one or more thermoelectric control thermoelectric elements (different polarity).

The invention further relates to a method of controlling the temperature in a compartment of a galley module having one or more of the features described above. The method is characterized in particular by the fact that the compartment is selectively cooled or heated, in the cooling mode in dependence on the cooling capacity and/or the cooling requirement of the compartment and the hot side of the thermoelectric element is heated with ambient air from the cabin or with conditioned cold air.

In a particularly preferred variant of the method according to the invention, before changing from a heating mode to a cooling mode or before changing from a heating mode to a cooling mode or from a cooling mode to a heating mode, ambient air from the cabin and/or conditioned cold air from the central cooling system of the aircraft is circulated through the compartment.

In a variant of the method according to the invention, the at least thermoelectric element is controlled in dependence on the cooling capacity and/or the cooling demand of the compartment concerned, according to the specification in a first, second or further operating mode where the thermoelectric element in the first mode extracts heat from the primary refrigerant supplied to the compartment and supplies this heat to the primary coolant supplied to the compartment, in the second mode of operation applies heat to the primary coolant supplied to the compartment, and extracts heat from the primary coolant discharged from the compartment. The term "the thermoelectric element" in the sense of the invention may mean an arrangement of several thermoelectric elements with electrical parallel and/or series connection.

In a particularly preferred variant of the method according to the invention, the speed of the fan assigned to the compartment is adapted to the cooling capacity of the cooling capacity of the respective cooling compartment and/or to the current cold demand.

BRIEF DESCRIPTION FO THE DRAWING

The invention is explained below with reference to the accompanying drawings by several examples of embodiments.

Therein:

FIG. 1 is a schematic diagram of a first embodiment of a galley module according to the invention, FIG. 2 is another view of a compartment according to the first embodiment of the galley module according to the invention, FIG. 3 a first view of a second embodiment of the galley module according to the invention, FIG. 4 is a second view of the second embodiment according to FIG. 3, FIG. 5 is a schematic view of a third embodiment of the galley module according to the invention, FIG. 6 shows a fourth variant of the galley module according to the invention with a rotatable thermoelectric element in a first operating mode, and FIG. 7 shows the variant of the galley module as shown in FIG. 6 in a second operating mode.

SPECIFIC DESCRIPTION OF THE INVENTION

First of all, reference is made to FIG. 1 that shows a galley module 1 with a first compartment 2 and second and third compartments 3 and 4. The first compartment 2 has a thermoelectric (Peltier) element 5 that is mounted on an insulating wall 6 of the first compartment 2 and that has an array of semiconductors 7 connected between a first heat exchanger 8 and a second heat exchanger 9. The first heat exchanger 8 forms the cold side of the thermoelectric element and the second heat exchanger 9 forms the hot side of the thermoelectric element 5. As mentioned above, the term "thermoelectric element" in the sense of the invention covers an array of several thermoelectric elements. The heat exchangers 8, 9 of the thermoelectric element 5 are designed as air-air heat exchangers. The thermoelectric element 5 has at least one fan, which for simplicity is not shown in FIG. 1.

In the system of FIG. 1, the second heat exchanger 9 forming the hot side of the thermoelectric element is exposed in a coolant duct 10 of a central cooling system 11 (galley chiller) of the aircraft. The second heat exchanger 9 of the first compartment 2 is as needed supplied with ambient air and/or conditioned cold air from the central cooling system 11 of the aircraft. The coolant duct 10 has a section serving as an air-intake duct 12 and a section is designed as an air-output duct 13. In order to be able to control the thermoelectric element 5 in accordance with the invention, a temperature sensor 14 is provided.

As can be seen in particular in FIG. 2, the first compartment 2 according to the first example is a closed cooling compartment with closed cold-air circulation. For this purpose, a fan 15 in the first compartment 2 is not mechanically coupled with the thermoelectric element 5 and its speed can be controlled independently of the operation of the thermoelectric element 5. In the first embodiment of FIG. 2, the air circuits of the first compartment 2 and the central cooling system 11 are separate from each other.

FIGS. 3 and 4 show an embodiment of the galley module 1 according to the invention with a compartment 2 designed for both heating and cooling. Also in this embodiment, the second heat exchanger 9 is the coolant duct 10 of the central cooling system. In this example, in which the same components are identified by the same references, the second heat exchanger 9 can form either the hot side and the cold side of the thermoelectric element. The coolant duct 10 has a cool-air distributor 17 between the air-intake duct 12 and the air-output duct 13 as well as an intake air flap 18 and an oppositely opening exhaust air flap 19 in the insulating wall 6 of the compartment 2 and that can open to connect the coolant duct 10 with the compartment 2. The intake air flap 18 and the exhaust air flap 19 can each be opened and closed by a controller. If the intake air damper 18 and the exhaust air damper 19 are both open, the cabin air and/or the conditioned air can be fully or partially circulated through the compartment 2. In this position of the intake air damper 18 and the exhaust air damper 19, the air circuits of the compartment 2 and the coolant duct 10 communicate with each other. Such air connection not only allows temperature to be controlled, but the compartment 2 can be switched between heating and cooling by being supplied with ambient or conditioned air. This has advantage that when changing from heating to cooling, air from the cabin of the aircraft air and/or conditioned cold air can first be fed to the compartment 2 so that the thermoelectric element 5 can effect further cooling from an already low temperature level. Conversely, for example, during changeover from cooling to heating cabin air is used first so that the compartment is warmed by the thermoelectric element 5 using warmer cabin air. A blower of the thermoelectric element 5 is indicated at 20.

FIG. 5 shows a third embodiment according to the invention. There also the same components are components identified above by the same references. In the embodiment according to FIG. 5 the air circuits of the first compartment 2 and the central cooling system 11 communicate with each other. The thermoelectric element 5 is between the air-intake duct 12 and the air-output duct 13 of the central cooling system 11 such that the first heat exchanger 8 is in the air-intake duct 12 and the second heat exchanger 9 is in the air-output duct 13. The if necessary conditioned air from the central cooling system 11 is cooled in the air-intake duct 12 further by the first heat exchanger 8 of the thermoelectric element 5 and circulated through the first compartment 2. In the air-output duct 13 of the central cooling system 11, the second heat exchanger 9 transfers the heat extracted from the intake air to the exhaust air flow that is returned to the central cooling system 11. With this embodiment different operating modes of the cooling system can be realized. For example, either ambient air or cold air (conditioned air) can be supplied via the air-intake duct 12. If the thermoelectric element 5 is not energized, cooling can only be effected with the cold air from the central cooling system. In a second mode the thermoelectric element 5 can be controlled in such a way that the first heat exchanger 8 extracts heat from the ambient air or the conditioned cold air in the air-intake duct 12. In third mode the polarity of the thermoelectric element 5 can be changed, so that the air in the air-intake duct 12 is heated and the air in the air-output duct 13 is cooled.

FIG. 6 shows a fourth embodiment of the galley module 1 according to the invention. In FIG. 6, the same components are again identified by the same references.

In the variant of the galley module 1 shown in FIG. 6, the coolant duct 10 of the central cooling system 11 is connected to the first compartment 2 via an air-guide housing 16 in which the thermoelectric element 5 can rotate. With this variant of the kitchen module 1 according to the invention, at least two different configurations are realizable as will be explained below. The first configuration corresponds to the first embodiment of the invention and the second configuration according to the third embodiment according to the invention. FIG. 6 shows a first operating mode of the thermoelectric element 5 in the air-guide housing 16, in which the cooling air duct 10 of the central cooling system 11 is separated from the air circulation or cold air circulation of the first compartment 2. The cold-air circulation within the first compartment 2 is maintained by a blower 15. The air circulated inside the compartment 2 is cooled by the first heat exchanger 8 of the thermoelectric element 5. The element 5 is cooled by the second heat exchanger 9 that is connected to the second heat exchanger 9 to the air circulating through the coolant duct 10. The thermoelectric element 5 can be switched during operation from the first operating mode shown in FIG. 6 to the second operating mode shown in FIG. 7. In this second position of the thermoelectric element 5, the coolant duct 10 forms an air-intake duct 12 into the first compartment 2 and an air-output duct 13 out of the compartment 2. The air circuit of the central cooling system 11 and the air circuit of the first compartment communicate with each other in the second operating mode of the thermoelectric element 5.

At this point it should be noted that by rotating the thermoelectric element 5 in the air-guide housing 16, it is also possible to switch between heating and cooling, since the cold side and the hot side of the thermoelectric element 5 can be switched by rotation of the thermoelectric element 5 inside the air-guide housing 16.

The invention claimed is:

1. An aircraft on-board kitchen module comprising:
a first compartment for drinks and/or food;
a thermoelectric element for conditioning an internal temperature of the first compartment and having a first and a second heat exchanger, one of the heat exchangers forming a cold side and the other heat exchanger forming a hot side of the thermoelectric element;
control means connected to the thermoelectric element such that heat generated by the thermoelectric element is extracted by a primary coolant from a central cooling system of the aircraft, the primary coolant being supplied via a coolant duct that is selectively supplied with ambient air from the cabin and/or conditioned cold air from the central cooling system of the aircraft; and
means for switching air circulation in the first compartment between a first operating mode with closed circulation of warm or cold air within the first compartment and a second operating mode with open circulation of cooling air through the coolant duct.

2. The galley module according to claim 1, wherein the thermoelectric element is switchable or reversible between the first operating mode in which the first compartment is cooled and the second operating mode in which the first compartment is heated.

3. The galley module according to claim 1, wherein the first heat exchanger is in a cool-air distributor of the coolant duct, the cool-air distributor has at least one operable intake air flap and one operable exhaust air flap, and the intake air flap and the exhaust air flap in opened positions allow the primary coolant to circulate through the compartment.

4. The galley module according to claim 1, wherein at least one fan is provided in the cooling duct and/or in the cool-air distributor.

5. The galley module according to claim 1, further comprising:
at least one second compartment with at least one second thermoelectric element is provided to which is fed ambient air and/or conditioned cold air from the central cooling system of the aircraft.

6. The galley module according to claim 1, wherein the first heat exchanger is in an air-intake duct connected to the first compartment so that the primary cooling medium cooled with the cold side of the thermoelectric element can be cooled further as required, and the second heat exchanger is in an air-output duct extending from the first compartment.

7. The galley module according to claim 6, wherein the thermoelectric element is between the air-intake duct and the air-output duct of the first compartment.

8. An aircraft on-board kitchen module comprising:
a first compartment for drinks and/or food;
a thermoelectric element for conditioning an internal temperature of the first compartment and having a first and a second heat exchanger, one of the heat exchangers forming a cold side and the other heat exchanger forming a hot side of the thermoelectric element;
control means connected to the thermoelectric element such that heat generated by the thermoelectric element is extracted by a primary coolant from a central cooling system of the aircraft, the primary coolant being supplied via a coolant duct that is selectively supplied with ambient air from the cabin and/or conditioned cold air from the central cooling system of the aircraft; and
an air-guide housing in which the thermoelectric element is rotatably mounted and that is between the coolant duct of the central cooling system and a coolant duct of the first compartment or a boundary wall of the first compartment.

9. The galley module according to claim 8, wherein the thermoelectric element during operation is rotated by at least one drive inside the air-guide housing for switching between the first operating mode and the second operating mode.

10. A method of controlling the temperature in a first compartment of a galley module according to claim 1, wherein the first compartment is selectively cooled or heated such that in a cooling mode in dependence on the cooling capacity and/or a cooling requirement of the compartment, the hot side of the thermoelectric element is cooled with ambient air from the cabin or with conditioned cold air.

11. The method according to claim 10, wherein, before switching from a heating mode to a cooling mode or before switching from a cooling mode to a heating mode, ambient air from the cabin and/or conditioned cold air from the central cooling system of the aircraft is circulated through the compartment.

12. A method of controlling the temperature in a compartment of a galley module according to claim 1, wherein the at least one thermoelectric element is operated by the control means in dependence on the cooling capacity and/or the cooling requirement and/or the heat requirement of the compartment in question in a first, second or further operating mode, the at least one thermoelectric element in the first operating mode extracting heat from the primary coolant supplied to the compartment and imparting heat to the primary coolant discharged from the compartment and in the second mode imparting heat to the primary coolant supplied to the compartment and extracting heat from the primary coolant discharged from the compartment.

* * * * *